May 19, 1942.    C. I. ROBINSON    2,283,576
CLOTHESLINE SUPPORT
Filed May 14, 1940
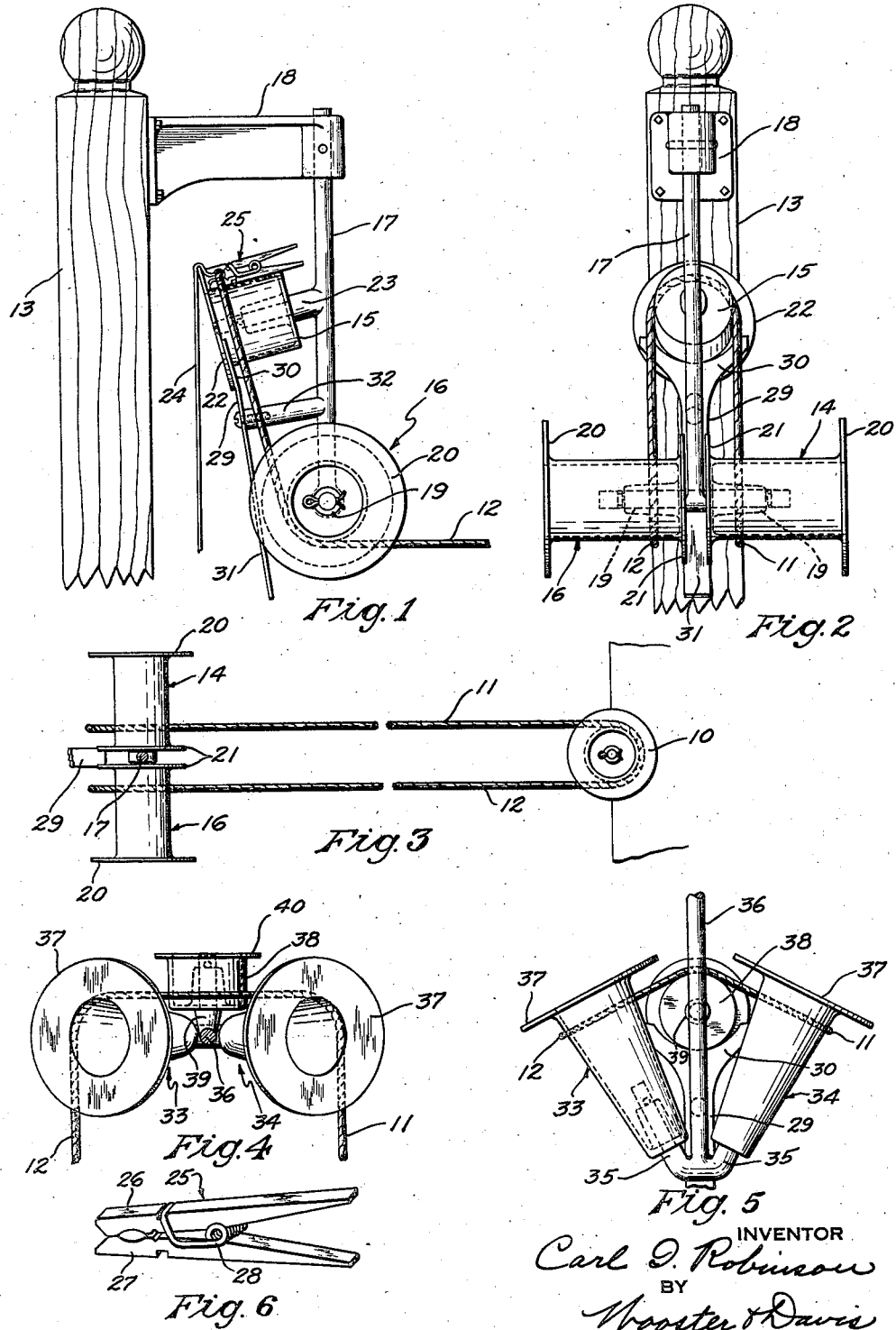

Patented May 19, 1942

2,283,576

UNITED STATES PATENT OFFICE 2,283,576

CLOTHESLINE SUPPORT

Carl I. Robinson, Danbury, Conn.

Application May 14, 1940, Serial No. 335,037

4 Claims. (Cl. 254—190)

This invention relates to pulleys for clotheslines, and has for an object to provide a simple and improved pulley for the outer end of a clothesline which will permit the line with clothes on it to pass over the pulley so that both runs of the lines between the two end pulleys can be used for supporting clothes.

It is also an object to provide an arrangement whereby the clothes put on the line first, and therefore ordinarily become dried first, can be removed from the line without disturbing the other clothes which were put on the line later and therefore may not yet be dry.

With the foregoing and other objects in view I have devised a construction illustrated in the accompanying drawing forming a part of this specification, but it is to be understood I am not limited to the specific construction and arrangement shown but may employ various changes and modifications within the scope of the invention.

In this drawing:

Fig. 1 is a side elevation of one form of my improved pulley support for the outer end of the clothesline shown mounted on a clothes pole or similar support;

Fig. 2 is a front elevation thereof looking from the right of Fig. 1;

Fig. 3 is a partial plan view and partial horizontal section showing how the device may be used;

Fig. 4 is a top plan view of a modified construction;

Fig. 5 is a front elevation thereof; and

Fig. 6 is a perspective view of a known type of clothespin which may be used with this device.

In Fig. 3 an ordinary pulley 10 is shown supported at the porch or loading end of a clothesline 11 and 12 and may be arranged to rotate in a vertical or horizontal plane as desired. The pulley support for the clothesline at the outer or other end is not ordinarily easily accessible and with ordinary pulleys it is possible to use only one run of the line in supporting the clothes. In this improved construction, however, both runs or sides 11 and 12 of the line may be employed for carrying the load thus doubling the capacity of the line. The improved pulley arrangement at the outer end of the line is shown as supported on the pole 13, and in the form of Figs. 1, 2 and 3 comprises three pulleys or wheels 14, 15 and 16 mounted on a depending support 17 carried by a suitable bracket 18 mounted on the pole 13. The pulleys or wheels 14, 15 and 16 are preferably in the form of drums, either substantially straight or tapered, but the shapes may be varied.

In the form of Figs. 1, 2 and 3 the two lower wheels 14 and 16 are substantially horizontal and run on bearings 19 carried by the support 17 at the lower portion thereof. These bearings are on extensions or arms projecting laterally in opposite directions from the support 17, and are preferably arranged so that the axes of these wheels are in substantially the same plane. These two wheels are shown in the form of substantially cylindrical drums and also preferably have flanges 20 and 21 to prevent the line passing off the wheels. The third wheel 15 in this form is located above the wheels 14 and 16, and also is in the form of a substantially cylindrical drum with a flange 22 to retain the line on the wheel. It is mounted on an arm 23 extending rearwardly from the support 17 and supports the wheel 15 to rotate on an axis in a plane between the lower wheels 14 and 16 and which plane extends transversely of the plane of the axes of the wheels 14 and 16, and as shown in Fig. 1 it is preferably somewhat to the rear of the wheels 14 and 16. In operation one run or side 11 of the clothesline runs under the wheel 14, upwardly and over the top of the wheel 15, and then downwardly and under the wheel 16 to the other side 12. As indicated, all three wheels may have flanges to keep the line on them. If in loading the line clothes are started on the side 11 this side may be completely filled and then filling continued until both sides 11 and 12 are filled, because after the side 11 is filled continuous shifting of it outwardly away from the pulley 10 will carry the clothes under the right hand wheel 14, up over the intermediate pulley 15 as shown in Fig. 1, a piece of cloth being shown at 24 held to the line by a suitable clothespin 25, and then downwardly and under the other wheel 16 on to the side 12. Due to the arrangement and shape of the elements this operation will be carried out without loosening the cloth or the clothespin.

Different types of clothespins may be used but I have found the spring grip type illustrated in Fig. 6 comprising two pivoted jaws 26 and 27 closed by a spring 28 to be very satisfactory. Sometimes a cloth or cloth article may be placed on the line without straightening it out properly, either through carelessness or where space may be limited and it is desired to get more clothes on to the line. This would result in a curved bend or loop in the top edge of the cloth article between the pins which might catch under the lower edge of the flange 22 of the upper wheel 15.

This can be prevented by the use of a guide 29, such as a wire or flat piece of metal, extending from close to the underside of the wheel 15 and immediately forwardly of the flange 22 as shown at 30 and down past the other wheels 14 and 16 as shown at 31. It may be mounted by any suitable means such as being secured to a rearwardly extending stud or arm 32 on the support 17. This effectively prevents the central or loose portion of any such loop passing under the lower edge of the flange 22 as the secured end portions of the upper edge of the cloth pass over the top of the wheel and the flange.

A modified construction and arrangement is shown in Figs. 4 and 5. Here instead of having the lower wheels substantially horizontal as in the form of Figs. 1 and 2 the corresponding wheels 33 and 34 are preferably tapered and mounted to rotate on bearings on laterally and upwardly inclined arms 35 projecting in opposite directions from the lower part of the support 36 corresponding to the support 17 of the first form. The wheels 33 and 34 may each have a flange 37 at its upper end to retain the line on the wheel. Between these two wheels is the third wheel 38 mounted on a laterally projecting arm or extension 39 of the support 36, and extending backwardly from this support so that the wheel 38 rotates on a substantially horizontal axis which is in a plane extending transversely of the plane of the axes of the wheels 33 and 34. This wheel 38 may also have a flange 40 to insure the line does not pass off the wheel. The operation is the same as in the first form, one side 11 of the line passing under the wheel 34, then over the intermediate wheel 38, and then downwardly and under the other wheel 33. As the cloth article moves with the line it passes under the wheel 34 and over the wheel 38 and its flange 40 the same as the form shown in Figs. 1 and 2. This modification of Figs. 4 and 5 is somewhat more compact than the first form and requires less room.

It will be seen from the foregoing description that this construction and arrangement of pulley permits the filling of both sides 11 and 12 of the line and therefore the use of the entire line, thus giving maximum capacity, while with common type pulleys only one side can be used. As the clothes are carried around from the side on which they are placed, as for example the side 11, to the other side 12, the clothes which are put on first and therefore presumably are the first to get dry can be taken off first without having to wait until the clothes last put on are dry.

Having thus set forth the nature of my invention, what I claim is:

1. A clothesline support comprising an upright fixed support, a pair of wheels arranged with their axes in substantially the same plane mounted on the lower part of said support, a third wheel arranged with its axis above the axes of the first wheels in a plane between the first wheels and extending rearwardly therefrom, an arm extending rearwardly from the upright support on which said third wheel is mounted, and means for mounting the wheels on said support and arm to leave the space under the first wheels free so that a line carrying clothes can pass under one of the first two wheels, over the top of the third wheel and then under the other of the first wheels, and said third wheel including a drum portion over which the line passes and of sufficient width to permit the clothespins to lie substantially parallel with the surface of the drum.

2. A clothesline support comprising a depending fixed bracket member, a pair of wheels mounted on the lower part of said member and one on each of the opposite sides of said member and rotatable about axes extending laterally from the opposite sides of said member, an arm extending rearwardly from said member above the axes of the first wheels, and a third wheel mounted on said arm to rotate on an axis extending substantially horizontally and transversely of the axes of the first wheels to carry a line running under the first wheels and over the third wheel, and said wheels comprising drum portions for guiding and supporting the line and of sufficient width to permit clothespins on the lines to lie substantially parallel to the surfaces of the drums.

3. A clothesline support comprising an upright fixed support, a pair of flanged wheels mounted one on each of the opposite sides of said support and rotatable on axes projecting laterally therefrom, an arm extending rearwardly and substantially horizontally from said support above said wheels, a third wheel mounted on said arm to rotate on an axis extending transversely of the axes of the first wheels to carry a line over the top thereof running under the first wheels and having a flange at its rear edge, and a guide member connected to the support and extending downwardly from a position closely adjacent the flange of the third wheel and rearwardly of the first wheels to guide clothes rearwardly of the flange.

4. A clothesline support comprising an upright fixed support, a pair of wheels comprising tapered drum portions mounted on opposite sides of said support to turn on axes outwardly inclined to said support and upwardly inclined from the horizontal, and a third wheel including a drum portion to carry a line running on the first wheels and mounted to turn on an axis extending rearwardly from said support above the lower ends of the first wheels, and said drum portions being of sufficient width to permit clothespins on the line to lie substantially parallel to the surfaces of the drums.

CARL I. ROBINSON.